June 29, 1965      C. VAN DER LELY      3,191,689

SPRING FORMED TOOL WITH A PIVOTAL MOUNTING

Filed March 16, 1961      3 Sheets-Sheet 1

INVENTOR.
CORNELIS VAN DER LELY
BY
Mason, Mason & Albright
ATTORNEYS

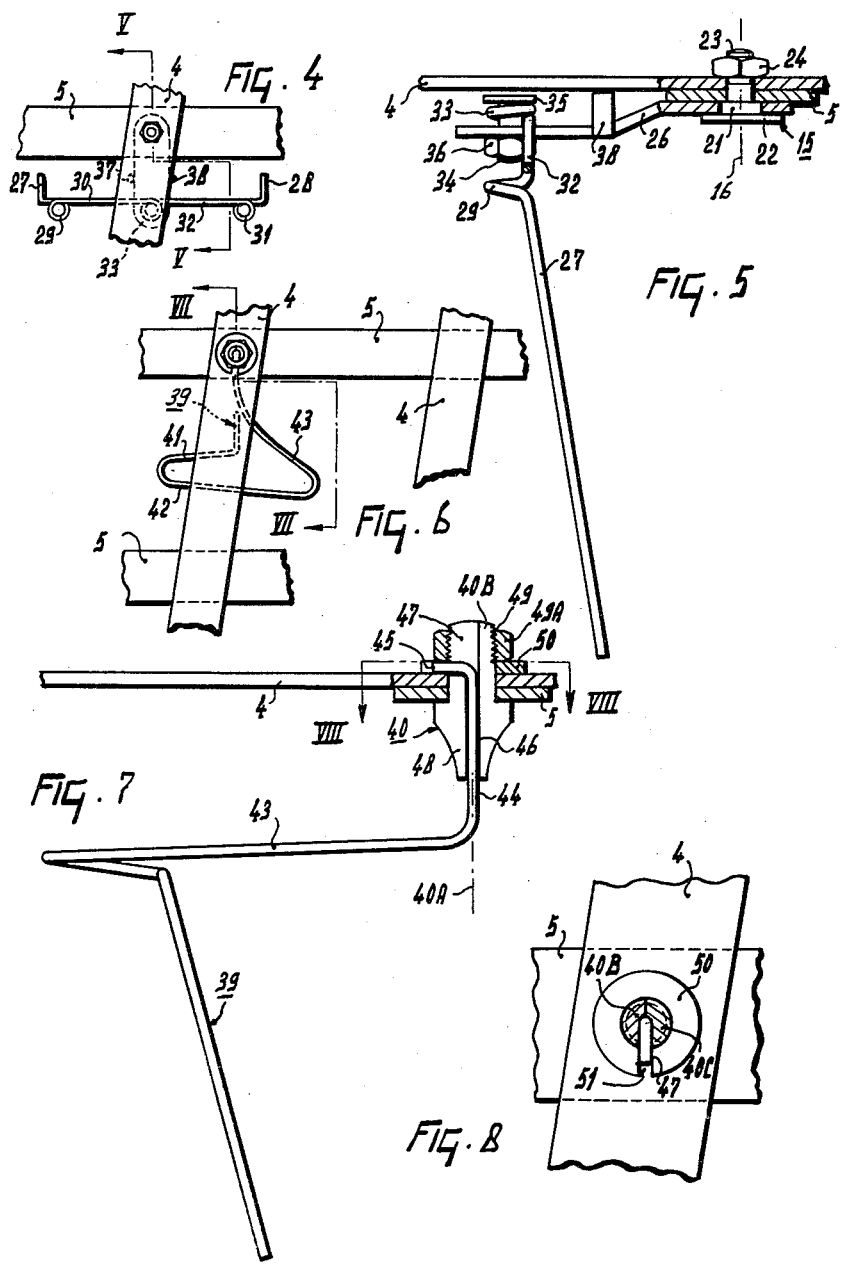

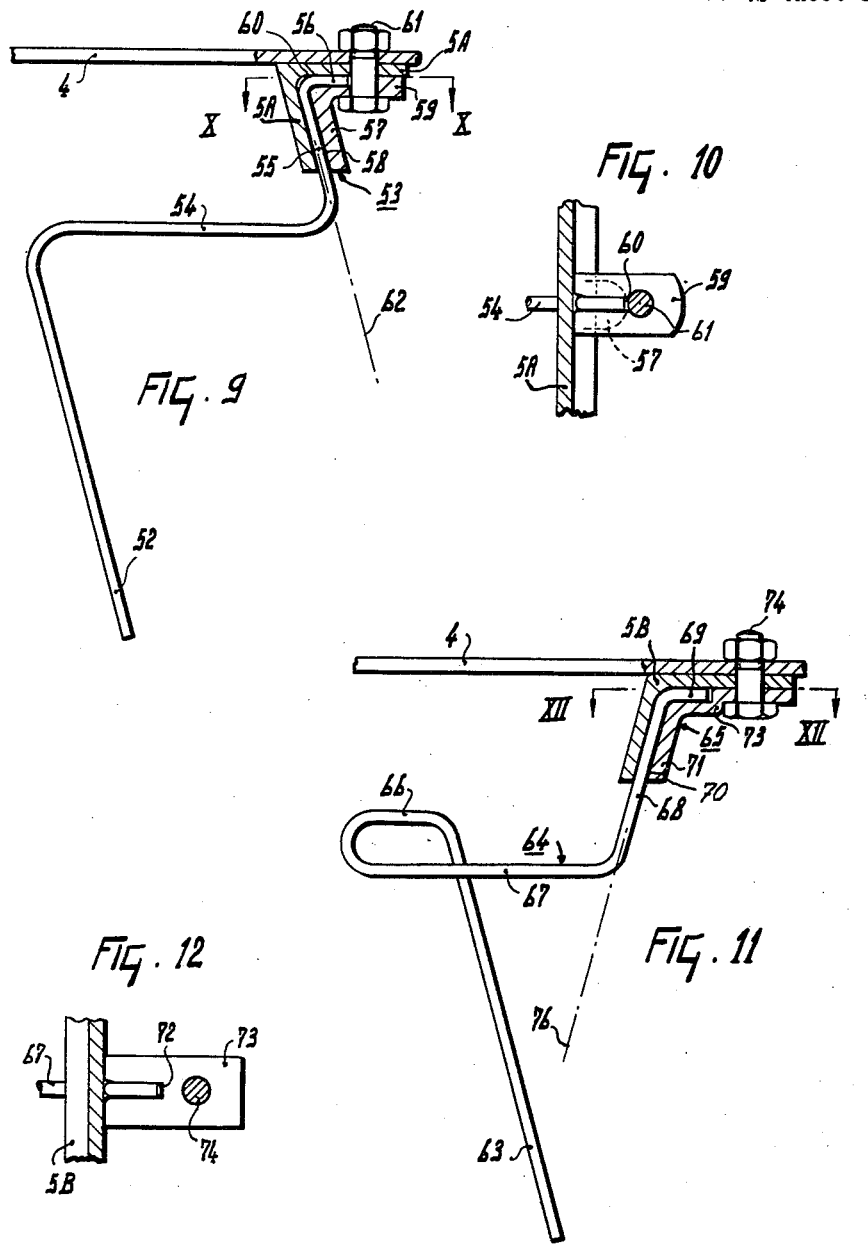

United States Patent Office 3,191,689
Patented June 29, 1965

3,191,689
SPRING FORMED TOOL WITH A PIVOTAL
MOUNTING
Cornelis van der Lely, Zug, Switzerland, assignor to
C. van der Lely N.V., Maasland, Netherlands, a Dutch limited-liability company
Filed Mar. 16, 1961, Ser. No. 96,159
Claims priority, application Netherlands, Apr. 8, 1960, 250,345
3 Claims. (Cl. 172—687)

This invention relates to harrows, cultivators and like agricultural implements (hereinafter referred to as harrows) of the kind having a plurality of tines which, during use of the harrow, are adapted to penetrate into the ground and to be dragged through it by a tractor or other draft means so as to break up or otherwise "work" the soil.

It is an object of the invention to provide harrows in which, during operation thereof, the tines are arranged to deflect to avoid obstacles in their path of movement without becoming permanently deformed to any substantial extent and to improve the working of the soil.

According to the present invention there is provided a harrow of the kind set forth, wherein each tine is connected to a harrow-frame so as to be turnable about a corresponding non-horizontal axis, the arrangement being such that a turn of any tine about its corresponding axis results in a displacement of at least a ground-working portion of the tine relative to the harrow frame.

Figure 1:
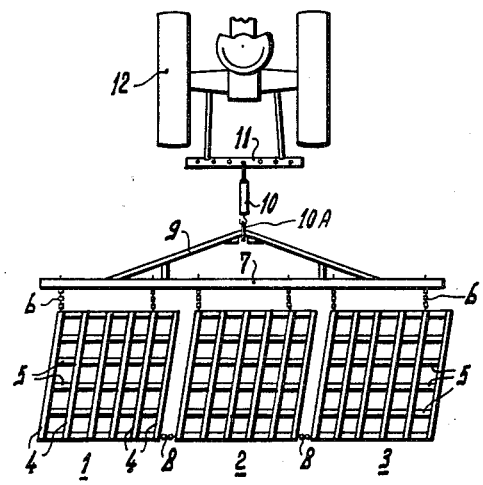
Figure 3:
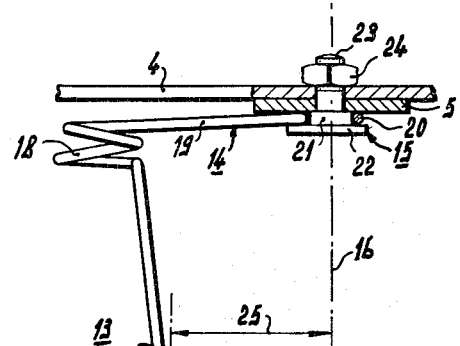
Figure 2:
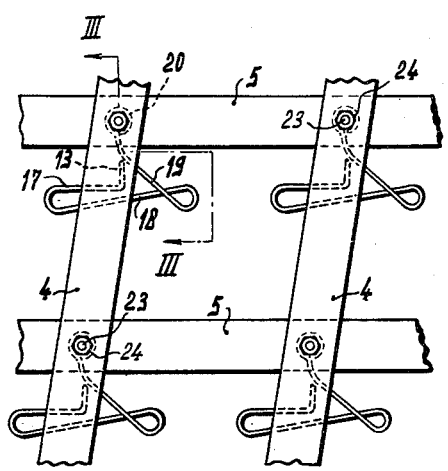

For a better understanding of the invention and to show how the same may be carried into effect, reference will now be made, by way of example, to the accompanying drawings, in which:

FIGURE 1 is a plan view of a harrow in accordance with the invention coupled to the rear of a tractor, FIGURE 2 is a plan view, to an enlarged scale, of part of the harrow shown in FIGURE 1, FIGURE 3 is a section, to an enlarged scale, on the line III—III of FIGURE 2, FIGURE 4 is a plan view similar to FIGURE 2 but showing an alternative embodiment of parts of the harrow, FIGURE 5 is a section, to an enlarged scale, on the line V—V of FIGURE 4, FIGURE 6 is a view similar to FIGURES 2 and 4 but showing a further alternative embodiment of parts of the harrow, FIGURE 7 is a section, to an enlarged scale, on the line VII—VII of FIGURE 6, FIGURE 8 is a section on the line VIII—VIII of FIGURE 7, FIGURE 9 is a sectional elevation, to an enlarged scale, of an alternative embodiment of parts of the harrow, FIGURE 10 is a section on the line X—X of FIGURE 9, FIGURE 11 is a view similar to FIGURE 9 showing a further alternative embodiment of parts of the harrow, and FIGURE 12 is a section on the line XII—XII of FIGURE 11.

Referring to FIGURE 1 of the drawings, the harrow comprises three substantially identical frames 1, 2 and 3 of parallelogram shape when seen in plan view. The leading edge of each of the frames 1 to 3 is releasably connected to a beam 7 by means of two chains 6 while the opposite ends of the rearmost edge of the frame 2 are connected to the adjacent corners of the frames 1 and 3 by two chains 8. The beam 7 extends transversely of the intended direction of travel of the harrow and has a shallow V-shaped member 9 attached to it in such a way that the point of the V projects forwardly of the harrow. A fastening link 10A is located at the point of the V and a resilient connection 10, provided at each end with hooks, connects the link 10A with the mounting beam 11 of a tractor 12 which is adapted to move the harrow over the ground. Each of the frames 1 to 3 comprises six longitudinal strips 4 and six transverse strips 5 arranged in the form of a lattice with the strips 4 uppermost and with a tine mounted at each of the thirty-six positions at which a strip 4 meets a strip 5. The strips 4 and 5 may be made from spring steel and are secured to each other in such a way that no substantial pivotal movement can take place between them in horizontal directions.

FIGURES 2 and 3 show one embodiment of the thirty-six tines with which each of the frames 1 to 3 is provided. Each tine has a ground-working portion generally indicated by the reference numeral 13 and a connecting portion generally indicated by the reference numeral 14, the portion 14 connecting the portion 13 with one of the junctions between two strips 4 and 5. The tine is made from spring steel wire and the portion 13, when in an unloaded state, is inclined downwardly towards the leading edge of the harrow. The portion 13 is straight and is integral with the connecting portion 14 which is comprised by a horizontal, straight portion 17 and a horizontal straight portion 18 which are connected by a bend and which extend substantially transversely to the intended direction of travel, a horizontal straight portion 19 which is connected to the portion 18 via a bend of more than 180°, and a loop 20. The portions 17, 18 and 19 are so arranged that, when seen in plan view, they have the approximate shape of a figure 8. The loop 20 is formed at the end of the length of wire affording the tine remote from the free end of the portion 13.

The loop 20 engages around a shoulder 21 formed on a bolt 15 by means of which a longitudinal strip 4 and a transverse strip 5 are fastened to one another. The strips 4 and 5 are clamped between one side of the shoulder 21 and a nut 24 received on the screw-threaded shank 23 of the bolt 15, the shank passing through aligned holes formed in the two strips. The loop 20 is arranged between the lowermost face of the strip 5 and the uppermost face of a head 22 of the bolt 15, the axial length of the cylindrical shoulder 21 being such that the tine is substantially freely turnable about the vertically disposed longitudinal axis 16 of the bolt 15. The connecting portion 14 of the tine is so shaped that the mid-point of the portion 13 is spaced from the axis 16 by a distance 25 which is approximately equal to one third of the length of the portion 13.

FIGURES 4 and 5 show an alternative form of tine and its connection to a junction between two strips 4 and 5, parts which are substantially identical to those previously described being designated by the same reference numerals. One end of a strip 26 is turnably arranged about the cylindrical shoulder 21 of the bolt 15 while its other end supports an integral pair of spring steel wire tines having ground-working portions 27 and 28, respectively, these portions being of similar shape and disposition to the portions 13 previously described. The upper end of the crop-working portion 27 is integral with a horizontal loop 29 and a horizontally disposed transverse straight portion 30 and the ground-working portion 28 is integral with a similar loop 31 and portion 32. The portions 30 and 32 are integrally connected by means of a horizontal loop 33. The loop 33 is coiled around the shank of a bolt 34 (not shown in FIGURE 4), the shank passing also through a hole in the end of the strip 26 remote from the bolt 15. The loop 33 is clamped rigidly between the head 35 of the bolt and a nut 36 received on the screw-threaded end of the shank. Upwardly extending pins 37 and 38 are secured to the opposite edges of the strip 26, the uppermost ends of the pins 37 and 38 being disposed at a level such that one or other of them will come into abutting engagement with the nearest edge of the strip 5 should the strip 26 be turned about the longitudinal axis 16 through a given maximum angle.

The arrangement shown in FIGURES 4 and 5 has the advantage that each of the frames 1 to 3 shown in FIGURE 1 may be provided with double the number of tines which is possible with the arrangement shown in FIGURES 2 and 3. However, if desired, three of the longitudinal strips 4 of each frame may be omitted thus increasing the flexibility of the frames while still providing the same number of tines as in the arrangement described with reference to FIGURES 2 and 3.

FIGURES 6, 7 and 8 show a further embodiment of a tine and the means by which it is coupled to the strips 4 and 5. The tine has a ground-working portion 39 similar to the portions 13 and 27 previously described, the portion 39 being integral with a horizontal straight portion 41 which is connected by a bend to a further horizontal straight portion 42 which, in turn, is connected by a still further bend to another substantially straight portion 43 whose other end is integral with a vertical portion 44. The portions 41 and 42 are substantially parallel and extend transversely to the direction of travel of the harrow, whereas the portion 43 is inclined at approximately 45° to the direction of travel of the harrow. The uppermost free end of the vertical portion 44 is bent over through 90° to form a short horizontal portion 45. The tine is connected to the strips 4 and 5 by means of a fastening member generally indicated by the reference numeral 40. The fastening member 40 has two separate segments 40B and 40C between which a vertical hole 46 is defined, the hole 46 receiving the vertical portion 44 of the tine. The short horizontal portion 45 is received in a groove 47 formed in the two segments of the fastening member 40 and is prevented from moving by means of a washer 50 having a recess 51 corresponding to the recess 47 and a nut 49A which is received upon the screw-threaded upper end 49 of the fastening member 40, the nut 49A serving also to secure the segments 40B and 40C to one another. The lower end of the fastening member 40 is in the form of an elongated head 48, the elongation being such that the vertical portion 44 of the tine is supported by the walls of the hole 46 throughout the greater part of its length.

In the arrangement shown in FIGURES 6 to 8, the tine is adapted to turn about the vertical axis 40A of the fastening member 40 by torsional deformation of the portion 44. The ground-working portion 39 and the vertical axis 40A are spaced apart from one another in a vertical plane extending in the intended direction of travel of the harrow, the said vertical plane also containing the mutually engaging faces of the segments 40B and 40C and the center line of the short horizontal portion 45.

FIGURES 9 and 10 show a further embodiment of a tine and the means by which it is connected to one of the frames of a harrow. In this case, the transverse strips 5 are replaced by beams 5A of V-shaped cross-section, the two limbs of the V being inclined to one another at an angle of less than 90°. One limb of the V of each beam 5A is substantially horizontally disposed whereas the other limb is inclined downwardly and forwardly with respect to the intended direction of travel of the harrow. The tine shown in the drawings is made of spring steel wire and includes a ground-working portion 52 of similar construction and disposition to the ground-working portions previously described. The upper end of the portion 52 curves through an angle of more than 90° and is integral with a straight horizontal portion 54 extending in the intended direction of travel of the harrow. The other end of the portion 54 is turned through a similar bend of more than 90° to form a portion 55 which extends substantially parallel to the portion 52. The upper end of the portion 55 has a horizontal bent over end 56 which extends parallel to the portion 54.

The tine is secured to a junction between one of the beams 5A and one of the strips 4 by means of a fastening member 53. The fastening member 53 is of similar cross-section to the beams 5A and is clamped to one of these beams and to one of the strips 4 by means of a bolt 61 which passes through aligned holes in the members just mentioned. The portion 55 is disposed in a hole formed by a groove 58 on one face of the semi-cylindrical downwardly inclined limb 57 of the fastening member 53 and the opposed face of the corresponding limb of the beam 5A. The bent over end 56 is received in a similar hole afforded by a groove 60 in the horizontal limb 59 of the fastening member 53, this limb being clamped against the lower face of the corresponding limb of the beam 5A. The relative dimensions of the portions 55 and the groove 58 are such that the portion 55 is turnable in the groove 58. However, since the end 56 is retained in the groove 60, the portion 55 can only turn about its longitudinal axis 62 by torsional deformation. The ground-working portion 52 is spaced from the axis 62 by a distance approximately equal to three-quarters of the length of the portion 52.

FIGURES 11 and 12 show a further embodiment of a tine and of the means by which it is secured to one of the frames 1 to 3. In this case, the lateral strips 5 are replaced by beams 5B of V-shaped cross-section, the two limbs of the V being inclined to one another at an angle of more than 90°. One limb of each beam 5B is substantially horizontally disposed whereas the other is inclined downwardly and rearwardly with respect to the intended direction of travel of the harrow. The spring steel wire tine has a ground-working portion 63 of similar construction and disposition to the ground-working portions prevously described, the upper end of the portion 63 being integral with connecting portion 64 comprises by a short straight horizontal portion 66, a vertically disposed 180° bend, a longer straight horizontal portion 67, an upwardly inclined straight portion 68 and a horizontal bent over end 69. The portions 66 and 67 and the end 69 extend in the direction of travel of the harrow. The tine is connected to the junction between a beam 5B and a strip 4 by means of a fastening member 65 which is secured to the parts just mentioned by a bolt 74 which passes through aligned holes therein. The fastening member 65 is of generally similar cross-section to the beam 5B and has a horizontal limb 73 and a limb 71 inclined to the vertical at the same angle as one of the limbs of the beam 5B. The portion 68 is received in a hole formed by a groove 70 in the limb 71 and the opposed face of the corresponding limb of the beam 5B and the bent over end 69 is received in a similar groove 72 in the horizontal limb 73, the groove 72 being closed by the lowermost face of the horizontal limb of the beam 5B. The portion 68 and groove 70 are so dimensioned that the portion 68 can turn in the groove 70. However, since the end 69 is retained in the groove 72, the portion 68 can only turn about its longitudinal axis 76 by torsional deformation. The longitudinal axis 76 is, of course, inclined to the vertical by the same angle as the lowermost limbs of the beam 5B and fastening member 65, respectively.

During operation of the harrow shown in FIGURE 1 in the case in which tines are arranged in the manner shown in FIGURES 2 and 3, each tine is readily displaceable with respect to its correspbonding frame 1, 2 or 3 by turning about the corresponding axis 16 since each ground-working portion 13 is removed from the corresponding axis 16 by the distance 25. During operation, each tine is located immediately behind the corresponding axis 16 with respect to the direction of travel, the tines, in addition to being turnable about the axis 16, being capable of resilient deformation in substantially all directions by torsional movements of the connecting portions 14. The bends between the portions 17, 18 and 19 of the tines are so arranged that the forces exerted on the ground-working portions 13 during operation of the harrow tend to close these bends so that permanent deformation of the connecting portion 14 does not tend to occur to any substantial extent.

When the arrangement shown in FIGURES 4 and 5 is employed, each pair of tines can only turn about the corresponding axis 16 to a limited extent in contradistinction to the arrangement shown in FIGURES 2 and 3 in which the tine is freely turnable about the axis 16 through 360°. In addition to being able to turn about the axis 16, the ground-working portions 27 and 28 can each turn about a substantially horizontal axis by torsional deformation of the portions 30 and 32, respectively. In addition to preventing damage to the tines, the fact that they are turnable about the axis 16 tends to ensure that the tines are correctly positioned during the passage of the harrow through a bend. The provision of the horizontal axes has been found to benefit the operation of the harrow in many cases.

When the harrow is equipped with tines of the kind shown in FIGURES 6 to 8, each ground-working portion 39 is turnable about the corresponding axis 40A by torsional deformation of the corresponding portion 44 and also about horizontal axes by torsional deformation of the portions 41 to 43. The arrangement is, of course, such that each portion 39 tends to return to a position in which neither it nor any other portion of the tine is torsionally deformed.

In the two arrangements shown in FIGURES 9 to 12, the ground-working portions 52 and 63, respectively are turnable about axes which are inclined to the vertical, the axis 62 (FIGURE 9) being downwardly and forwardly inclined with respect to the direction of travel whereas the axis 76 (FIGURE 11) is downwardly and rearwardly inclined with respect to the direction of travel. The inclination of these axes to the vertical offers the advantage that, when the ground-working portion 52 or 63 meets an obstacle in the ground, the torsional deformation of the portion 55 or 68 which occurs allows the portion 52 or 63 to move in a vertical direction as well as in a horizontal direction.

The portion 54 (FIGURE 9) and the portion 64 (FIGURE 11) are each located in substantially the same vertical plane extending in the direction of travel of the harrow as that which contains the corresponding ground-working portion 52 or 63. Thus, the portions just mentioned are not capable of turning torsionally about horizontal axes extending transversely of the direction of travel of the harrow. The ground-working portions 52 and 63 will therefore have a somewhat greater resistance to forces acting in directions parallel to the direction of travel since they are movable in a vertical plane extending in the direction of travel only by resilient deformation of the portions 54 and 64, respectively. The portions 54 and 66, 67 can, however, be torsionally deformed by forces acting on the ground-working portions 52 and 63 in directions transverse to the direction of travel. In the arrangement shown in FIGURES 11 and 12, the axis 76 of the portion 68 intersects the ground-working portion 63 at a position close to the lowermost end of the latter. This arrangement ensures that the portion 63 can only deflect through small distances relative to the corresponding frame by turning about the axis 76. Thus the tine can be of somewhat more rigid construction than in the other cases described, this allowing the harrow to be used successfully with heavier or more compact soils.

The slight forward incliniation of the ground-working portion of each tine relative to the direction of travel which is exhibited in the unloaded state of the tines is necessary to ensure that these portions occupy the correct positions for working the ground efficiently during operation of the harrow.

What I claim is:

1. A harrow comprising a frame, a plurality of tines, each tine including a substantially vertically disposed ground-working portion, a substantially horizontal supporting portion having at least one horizontally disposed loop between said supporting portion and ground-working portion, said supporting portion extending generally forwardly of the upper part of said ground-working portion, said tine including a supporting element freely turnably mounted on said frame about a substantially vertical axis, said tine comprising a single length, torsionally deformable wire-like element.

2. A harrow as claimed in claim 1 wherein at least the major part of the said supporting portion of the tine extends transversely of the intended direction of travel of the harrow.

3. A harrow as claimed in claim 1 wherein the ground-working portion and the supporting portion of the tine are both substantially straight and disposed substantially perpendicular to each other.

References Cited by the Examiner

UNITED STATES PATENTS

| | | | |
|---|---|---|---|
| 181,173 | 8/76 | Hughes | 172—748 |
| 209,945 | 11/78 | Tompkins | 172—713 |
| 273,105 | 2/83 | Kenton | 172—748 X |
| 294,292 | 2/84 | Viele | 172—713 X |
| 541,178 | 6/95 | Park | 172—748 |
| 644,096 | 2/00 | Rhodes | 172—173 X |
| 794,986 | 7/05 | Kendig et al. | |
| 795,335 | 7/05 | Burgess | 56—400 |
| 839,310 | 12/06 | Nelson | 172—707 X |
| 1,163,586 | 12/15 | Bunce | 172—198 |
| 1,252,627 | 1/18 | Strack | 172—748 X |
| 1,718,248 | 6/29 | Mohr | 172—687 X |
| 2,040,689 | 5/36 | Duhain | 56—400 |
| 2,963,096 | 12/60 | Fischer | 172—198 |

T. GRAHAM CRAVER, *Primary Examiner.*

A. JOSEPH GOLDBERG, EUGENE G. BOTZ, ABRAHAM G. STONE, ARNOLD RUEGG, *Examiners.*